United States Patent [19]
Jaminet et al.

[11] Patent Number: 4,723,348
[45] Date of Patent: Feb. 9, 1988

[54] HYDRAULIC CYLINDER REPAIR FIXTURE

[75] Inventors: Randal L. Jaminet, Hazel Green, Wis.; Jerry B. Hawbaker, Bellevue; Robert L. Peters, Earlville, both of Iowa

[73] Assignee: Deere & Company, Moline, Ill.

[21] Appl. No.: 907,247

[22] Filed: Sep. 15, 1986

[51] Int. Cl.$^4$ .............................................. B23P 19/04
[52] U.S. Cl. ...................................... 29/240; 81/57.39
[58] Field of Search .............. 29/240; 81/57.34, 57.35, 81/57.39; 269/251

[56] References Cited

U.S. PATENT DOCUMENTS

| | | | |
|---|---|---|---|
| 2,764,047 | 9/1956 | Allbritton | 269/251 |
| 2,984,000 | 5/1961 | McConnell | 29/240 |
| 3,626,573 | 12/1971 | Blake | 29/240 X |
| 3,900,938 | 8/1975 | Blomgren, Sr. et al. | 29/240 |
| 4,092,881 | 6/1978 | Jürgens et al. | 29/240 X |

OTHER PUBLICATIONS

"Tuxco Hydraulic Cylinder Service", Catalog No. 684, 1984.

Primary Examiner—Frederick R. Schmidt
Assistant Examiner—Judy J. Hartman

[57] ABSTRACT

A torque-applying device for a cylinder rod and piston in which the threaded end of the rod extends through the piston and is retained thereon by a nut tightened against the piston composed of an open-ended, elongated, horizontally extending rectangular square tube, a stabilizing stand supporting one end of the tube and a structural post depending from and supporting the opposite end of the tube; a rectangular-shaped, piston rod carrier having its outer dimension substantially the same as the internal dimensions of the rectangular tube and supported within the tube to slide horizontally, the carrier having a pin thereon for non-rotatably mounting on the carrier the remote or free end of the piston rod, a wrench mounted on the nut at the piston end of the piston rod and including a torque-applying arm, and an hydraulic cylinder extending between the post and arm for applying torque to the wrench and nut for tightening and/or loosening the nut on the threaded end of the rod.

6 Claims, 5 Drawing Figures

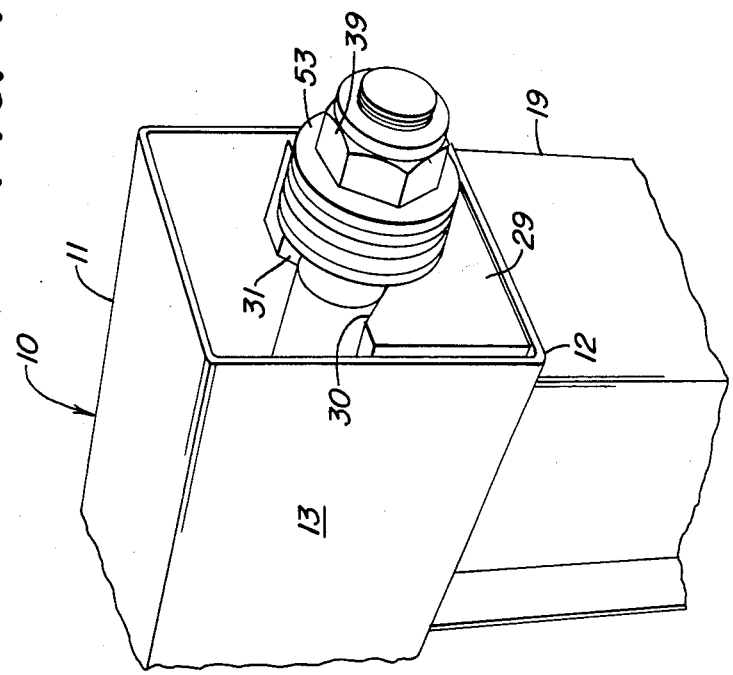
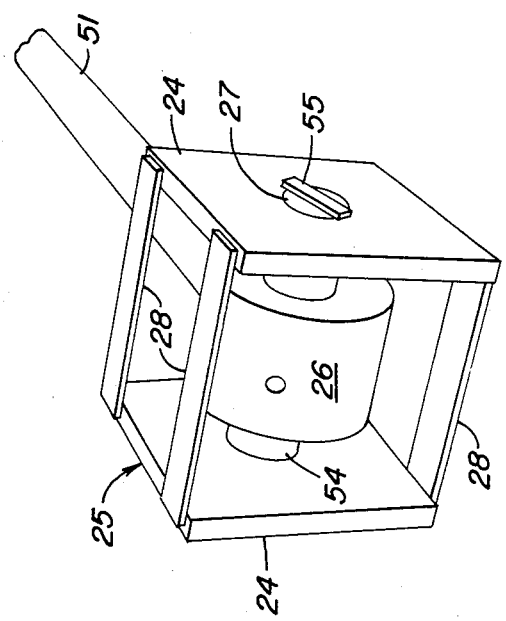

HYDRAULIC CYLINDER REPAIR FIXTURE

BACKGROUND OF THE INVENTION

Conventional hydraulic cylinders are composed of a cylindrical housing that contains within the housing a piston which moves axially therein. Mounted on or connected to the piston is a piston rod that extends through the end of the cylindrical housing along the axis thereof to a remote or free end. The opposite end of the rod extends through the piston and is threaded. The threaded end receives a nut which tightens against the piston for holding the piston on the rod. The remote or free end normally has a connecting structure thereon that utilizes a pin extending radially with respect to the axis of the rod and which connects the rod to a unit or member that utilizes the power of the hydraulic cylinder.

One of the problems relating to large hydraulic cylinder assemblies of the type that is used, for example, on industrial equipment, is the servicing of the assembly and particularly the piston and the piston rod. Often, the piston will carry the piston rings and seals that, over a period of time, become worn. Consequently, it is necessary to remove entirely the total piston and piston rod from the cylinder. Normally, the piston is connected to the threaded end of the piston rod by a nut with a relatively large torque. This torque is of such magnitude that it is greater than that which may be done manually by a man turning the nut with a conventional type wrench. It is therefore necessary to provide power means for applying additional torque to the nut when it is being tightened against the piston or when it is being removed from the piston so that the rod and piston may be serviced.

SUMMARY OF THE INVENTION

With the above in mind, it is the primary purpose of the present invention to provide a simple hydraulic cylinder repair fixture that may be used to tighten the nut and loosen the nut, as the respective case requires, on the threaded end of the rod. Specifically, there is to be provided a rectangular or square-shaped tube that is positioned horizontally. Extending upwardly from the upper surface of the tube is a clevis type connection for connecting a cylinder of an hydraulic cylinder assembly to the clevis so that the cylinder and its piston and rod may be separated. Mounted within the tube is a rod carrier having a pin that connects the remote end of the rod to the carrier and which prevents relative rotation between the carrier and rod. The carrier has outside dimensions substantially equal to the internal dimensions of the tube and consequently, the carrier cannot rotate within the tube. The piston end of the rod projects out of an open end of the tube and an adjustable torque wrench is mounted on the nut that holds the piston on the rod. A torque arm projects radially to one side of the nut. The torque arm is connected to an hydraulic cylinder that extends between the arm and a post, depending from and supporting the end of the tube. The torque wrench may be reversed so that the arm may project in either direction. Thus, the desired or same power stroke of the hydraulic cylinder will tighten or loosen the nut, depending on the direction the torque arm extends.

BRIEF DESCRIPTION OF THE DRAWINGS

FIG. 3 is a perspective view showing the carrier and the remote end of the piston rod mounted thereon.

FIG. 4 is a perspective view of one end of the fixture and with the piston rod positioned in the tube of the fixture and with the piston on the rod being supported at the open end of the tube.

DESCRIPTION OF THE PREFERRED EMBODIMENT

Figure 1:
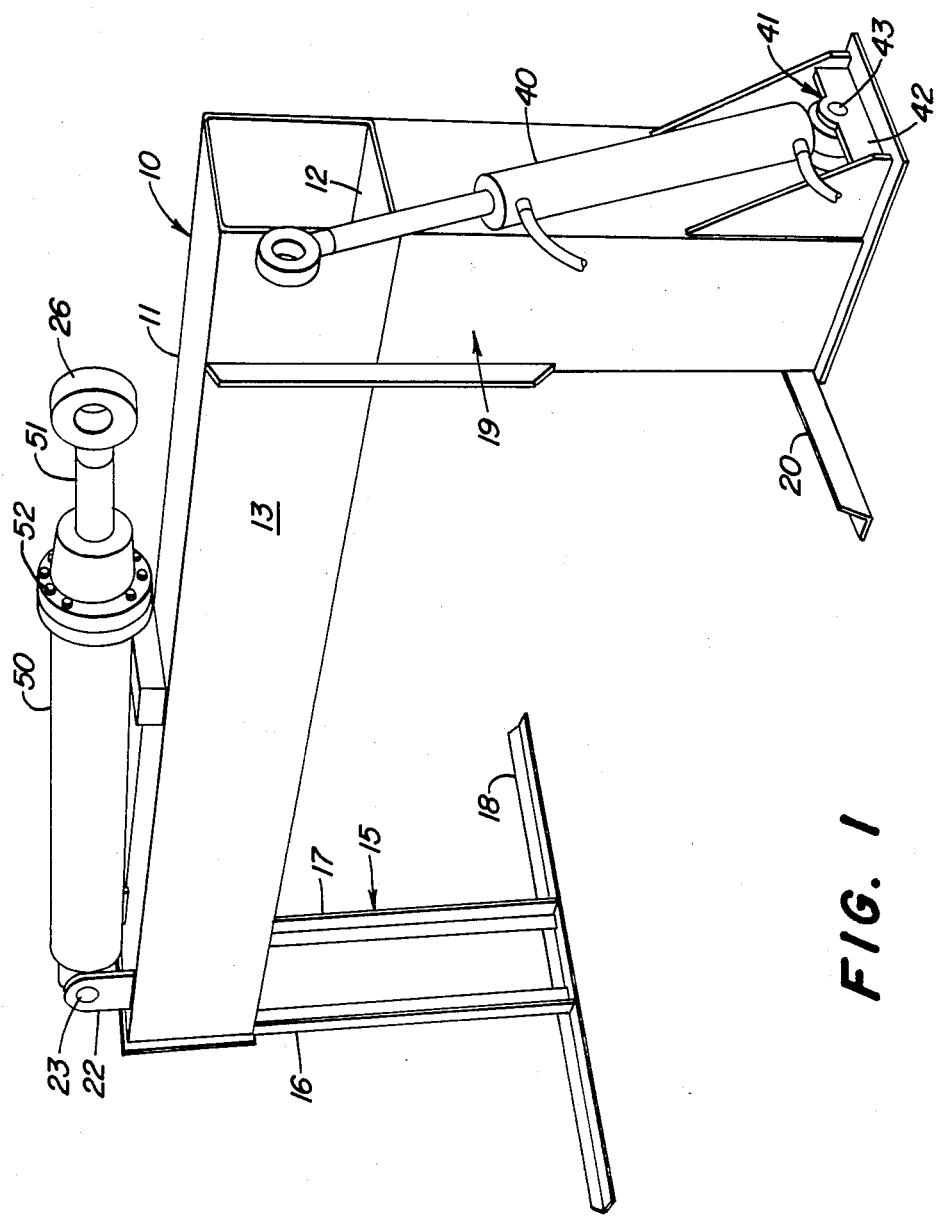
FIG. 1 is a perspective view taken from one end and to a side of the fixture of the present invention and showing an assembled hydraulic cylinder assembly mounted on the top of the fixture.

Referring now to the drawings, the hydraulic cylinder repair fixture, which is the subject matter of the present invention, is composed in a main part of an elongated, horizontally extending square sectioned structural tube 10. It should be recognized that while the present structural tube 10 is square in cross-section, any shaped tube would be satisfactory so long as it is multi-sided. The tube 10 is composed of upper and lower horizontal walls 11, 12 connected at their opposite edges by vertical side walls 13, 14. The tube 10 is open-ended and is supported at one end by a stabilizing stand 15 composed, in part, by a pair of vertical posts 16, 17 that are welded at their upper ends to the lower horizontal wall 12 and depend therefrom. The lower ends of the posts 16, 17 are welded to a transversely extending horizontal angle iron beam 18 which serves to stabilize that end of the tube structure. The opposite end of the tube 10 is supported on a post 19, which is of the same material and shape as the main tube 10. The upper end of the tube or post 19 is welded to the underside of the wall 12 and depends therefrom. A stabilizing horizontal beam 20, similar to the beam 18, is welded to the rear lower end of the vertical plate of tube 19 and extends outwardly from the post or tube 19 to offer stabilization at that end of the device.

Rigid with and projecting upwardly from the upper surface of the upper wall 11 are a pair of ears 22 that are transversely spaced apart and have transversely aligned openings therein for receiving a pin 23. The ears 22 and pin 23 serve as a clevis for connecting the cylinder end of an hydraulic cylinder assembly thereto in a manner and for the purpose to be set forth later. Referring now to FIG. 3, carried within the tube 10 is a rod carrier 25 which is square in cross-section and has its outer dimensions substantially equal, although slightly smaller, than the internal dimensions of the structural tube 10. The carrier 25 is composed of a pair of transversely spaced, vertical side walls 24, rigidly interconnected at their respective upper and lower edges by horizontal and transversely extending metal straps 28. The carrier 25 is insertable in the structural tube 10 so that it can move lengthwise of the tube. The side walls 24 of the carrier 25 are provided with transversely aligned openings which receive a pin 27, provided for the purpose of connecting the eye brackets 26 at the remote or free ends of piston rods to the carrier 25.

Figure 2:
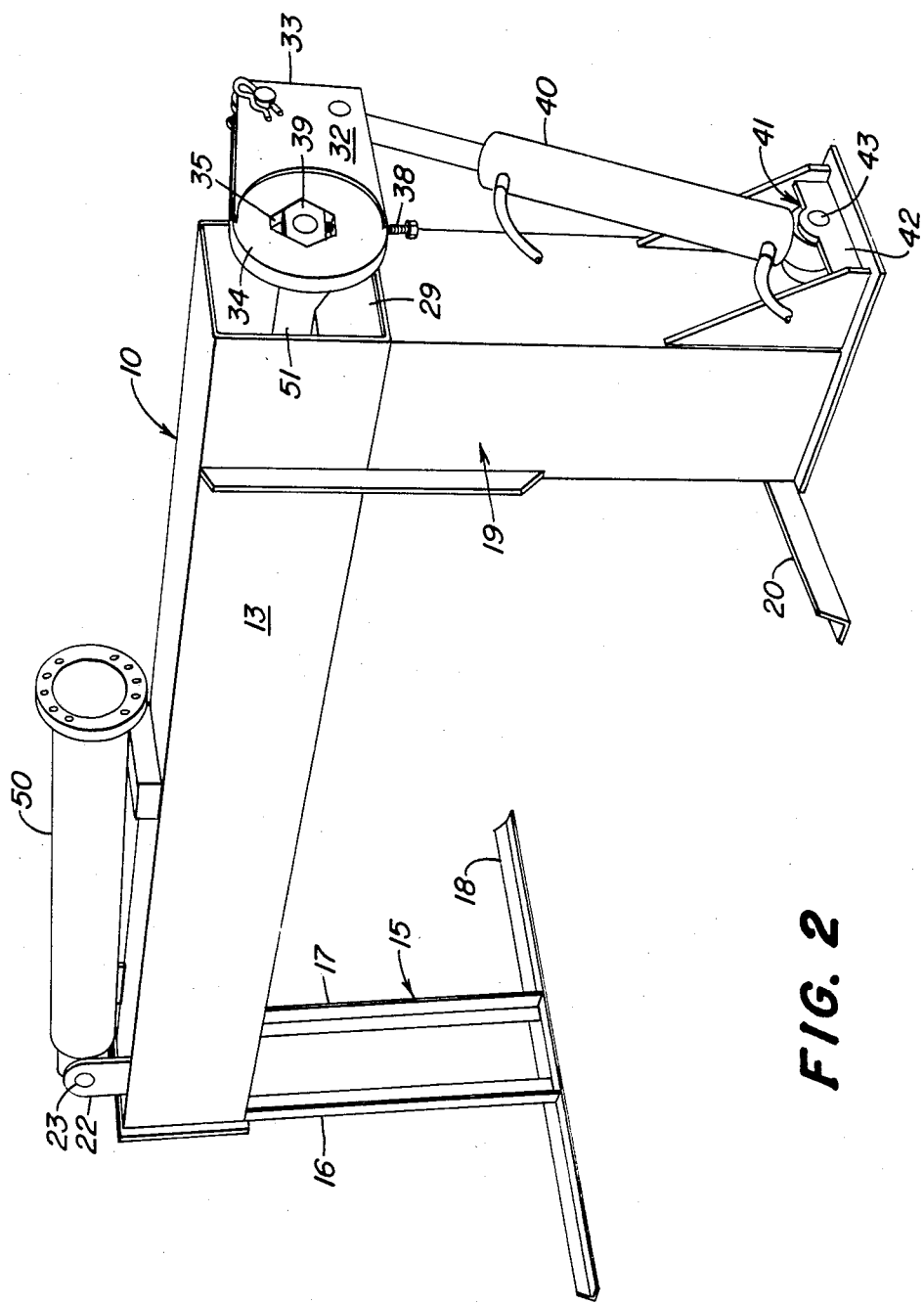
FIG. 2 is a view similar to FIG. 1 but showing the hydraulic cylinder assembly disassembled with the rod and piston assembly thereof inserted into the fixture.
Figure 5:
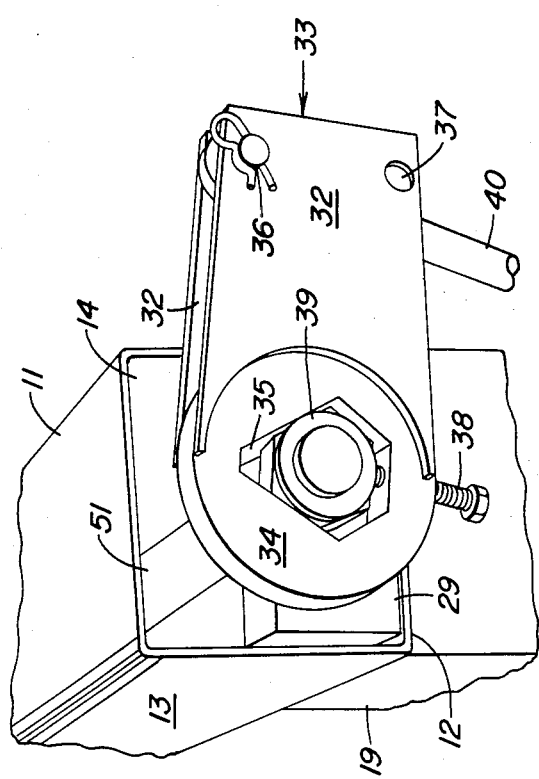
FIG. 5 is an end perspective view of the fixture and showing a torque wrench and its associated cylinder mounted on the nut that holds the piston on its piston rod.

Referring now to FIG. 4, a V-block 29 substantially the width of the structural tube member 10, is positioned adjacent the end of the tube 10. The block 29 has downwardly converging upper surfaces 30, 31 forming the V of the V-block and, which will later become apparent, serves to underlie and vertically support the end of a piston rod adjacent its piston. Referring to FIGS. 2 and 5, an adjustable wrench 33 is provided at the open end of the structural tube 10 and is composed of a solid circular plate 34 having a centrally located, multi-sided opening 35. A pair of spaced-apart plates 32 are welded to opposite sides of the plate 34 adjacent its periphery and extend outwardly therefrom. The plates serve as the torque arm for the wrench 33. Upper and lower pin-receiving openings 36, 37 are provided in the outer ends of plates 32. The adjustable portion of the wrench is of conventional style and is composed of the opening 35 and a vertically extending threaded stud 38 that is threadedly mounted in the plate 34 and has its upper end extending into the opening 35. Two sides of the opening 35 converge upwardly and are capable of resting against a pair of sides of various sizes of hexagonal nuts, one of which is shown at 39. The upper end of the stud 38 bears against the underside of the nut 39 and when threaded upwardly, forces the upwardly converging sides of the opening 35 against alternate sides of the nut 39. When tightened, the stud 38 will rigidly hold the nut 39 in the opening 35.

Referring now to FIGS. 2 and 5, the arm or plate portion 32 of the wrench 33 projects outwardly to the right substantially at three o'clock. Connected to the opening 36 by means of a pin is the upper end of a hydraulic power unit 40, the lower end of which extends into and is connected to a clevis type connection 41 which receives its basic support from the vertical post 19. The clevis 41 is formed, in part, by the front vertical wall of the post 19 and an L-shaped ear plate 42 that has an upwardly extending portion with an opening therein that is aligned with a similar opening in the front plate of post 19, both of which receive a pin 43. The cylinder end of the hydraulic unit 40 is connected to the clevis 41 by the pin 43. The desired power stroke of the cylinder 40 is in the retracting mode. Consequently, to tighten a nut such as at 39, it is necessary to have the wrench 33 extend to the right and to retract the cylinder 40. As is clearly obvious, should it be desired to loosen the nut 39, the wrench 33 may be reversed so that the arm portion of the wrench extends substantially at nine o'clock and retraction of the cylinder 40 will then loosen the nut 39.

Referring now to the drawings for operation of the torque device, a completely assembled hydraulic cylinder 50 having a rod 51 is placed on the top wall 11 of the structural tube 10 with the cylinder end adjacent the ears 22. The cylinder end is attached to the ears 22 by inserting the pin 23 through the eye of the cylinder. At this time, the rod guide cap screws 52 are removed to permit the rod guide and rod sub-assembly to be removed from the cylinder barrel. This may be done manually if the cylinder and rod are relatively lightweight. However, on the heavier or larger cylinder assemblies, an overhead hoist may be required. The rod sub-assembly includes piston 53 which is held on the rod 51 by means of the nut 39 that is threadedly attached to the end of the rod 51 which extends through the piston. The nut 39 is, at this time, tight against the piston 53. Once removed from the cylinder, the rod 51 and its piston 53 is mounted on the carrier 25 by having the remote end of rod 51 connected to the carrier 25 by the pin 27 which extends through the eye 26 on the remote end of the rod 51 and the side plates 24. A removable sleeve 54 is inserted within the eye 26 and between the pin 27 and eye so as to protect the internal surface of the eye against damage when the torque load is applied. Suitable retainers, such as at 55, are provided on opposite ends of pin 27 so as to prevent slippage of the pin out of the respective openings in side plates 24 of carrier 25. If an overhead hoist is required, it will be used to slide the rod assembly, including the carrier 25, into the square structural torque tube 10 so that the piston nut 39 extends from the head or open end of the torque tube 10. The rod 51 and its piston 53 is supported generally along the axis of the torque tube by the carrier 25 at the remote end of the rod 51 and the V-block 29 within and adjacent the open end of the tube 10. The V-block 29 is preferably positioned against the piston 53 as shown in FIG. 4. The nut 39 is positioned just outwardly of the open end of the tube 10 so that the nut opening 35 may receive the nut 39. The stud 38 is then tightened against the nut 39 so that it is locked against rotation in the opening 35. If it is desired to loosen the nut 39, the torque wrench is positioned so that its arm portion extends in a substantial nine o'clock direction and the cylinder 40 is retracted so as to turn the nut 39 in a counterclockwise direction. The carrier 25, bearing against the internal surfaces of the structural tube 10, will not permit the rod 51 to rotate or rock and consequently, the nut will loosen. When it is desired to tighten the nut 39 on the rod 51, the torque wrench 34 is positioned so that the arm extends substantially in the three o'clock direction so that when the cylinder 40 is retracted, the nut tightens. The nut 39 is first tightened manually as far as possible. The cylinder 40 is normally initially connected to the lowermost of the openings 36, 37. As the cylinder retracts, it will increase the torque on the nut 39. It will also lower the arm portion of the wrench 33, thereby reducing the effective radius between the nut 39 and cylinder 40. At this time, the cylinder 40 may be connected to the upper of the openings 36, 37 to thereby increase the effective radius between the nut 39 and cylinder 40. It should be understood that, while not shown, the pressure within the cylinder 40 may be adjusted and measured so that the desired torque load on the nut 39 may be reached.

The cylinder 40 gives a large load on the wrench arms and consequently, the torque load will be considerably greater than that which a human could place on the nut 39. It should also be recognized that a square structural tube, such as 10, offers tremendous strength and consequently, the carrier 25 will resist almost any torque load without damaging the tube 10. The carrier 25, being able to slide along the tube 10, may be easily adjusted for receiving any length of rod assembly. Consequently, no adjustment in the structure is required for different sized pistons and cylinders. Therefore, this device may be accurately described as fitting a large range in types or sizes of rod and piston assemblies. When it is desired to replace the repaired piston 53 and rod 51 in the cylinder, the reverse of removing it from the cylinder occurs and the cap screws 52 are replaced to fit the rod guide back on the cylinder.

The entire cylinder repair fixture is relatively lightweight and may be transported to different locations for repairing cylinders at those locations. There is no reason to anchor the unit to a floor, as is required with other fixtures now being sold, since this unit is entirely self-contained.

We claim:

1. A servicing device for an hydraulic cylinder assembly having a cylinder rod and piston in which the end of the rod extends through the piston and is retained thereon by a nut tightened against the piston, said device comprising: an open-ended, elongated, horizontally extending multi-sided structural tube; a stabilizing stand supporting one end of the tube; a structural post depending from and supporting the opposite end of the tube; a rod carrier supported within the tube to adjust horizontally lengthwise of the tube and having portions thereof engaging the internal surfaces of the tube so as to prevent relative rotation between the tube and carrier, said carrier having means thereon and within the tube for non-rotatably mounting the remote end of a piston rod on the carrier and for moving the piston rod within the tube as said carrier is shifted away from the open end of the tube; a rod support mounted in the tube adjacent its open end and seatable under the piston rod extending into the tube; a wrench mountable on the nut at the piston end of the piston rod and including a torque-applying arm; and a hydraulic cylinder extending between the post and arm for turning said wrench.

2. The invention defined in claim 1 in which the tube is quadrangular in cross section and said carrier has a quadrangular-shaped outer periphery that is generally of the size and shape of the interior of the tube.

3. The invention defined in claim 1 in which the tube is square in cross section and said carrier has a square-shaped periphery that is generally of the size and shape of the interior of the tube.

4. The invention defined in claim 1 in which said structural tube has an upper horizontal wall and further characterized by a clevis-type connection fixed to and extending upwardly from the wall and which is receivable of a pin connecting the cylinder end of a cylinder assembly to the connection.

5. The invention defined in claim 1 in which the post is centrally located beneath the longitudinal axis of said tube and said hydraulic cylinder has its lower end connected to the post centrally beneath the tube and said wrench may be applied to the nut so that torque-applying arm may selectively extend to either side of said nut.

6. A service device for an hydraulic cylinder assembly having a cylinder rod and piston in which a threaded end of the rod extends through the piston and is retained thereon by a nut tightened against the piston, said device comprising: an open-ended, elongated, horizontally extending structural rectangular tube; a stabilizing stand supporting one end of the tube; a structural post depending from and supporting the opposite end of the tube; a rod carrier having its outer dimensions substantially the same as the interior dimensions of the tube and supported within the tube to slide horizontally, said carrier having means thereon and within the tube for non-rotatably mounting the remote end of a piston rod on the carrier and for moving the piston rod within the tube as said carrier is shifted horizontally away from the tube; a rod support mounted in the tube adjacent its open end and seatable under the piston rod extending into the tube; a wrench mountable on a nut on the threaded end of a piston rod and including a torque-applying arm; and an hydraulic cylinder extending between the post and arm for turning said wrench.

* * * * *